United States Patent
Sato

(10) Patent No.: US 6,657,657 B1
(45) Date of Patent: Dec. 2, 2003

(54) CAMERA, PRINTER AND PICTURE COMPRESSION SYSTEM

(75) Inventor: Koichi Sato, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/217,555

(22) Filed: Dec. 21, 1998

(30) Foreign Application Priority Data

Dec. 19, 1997 (JP) .......................................... P9-365071

(51) Int. Cl.7 .............................................. H04N 5/225
(52) U.S. Cl. .................................... 348/207.2; 348/376
(58) Field of Search .............................. 348/207.2, 376, 348/207.1, 207.11

(56) References Cited

U.S. PATENT DOCUMENTS

| | | | | |
|---|---|---|---|---|
| 4,937,676 A | * | 6/1990 | Finelli et al. ............... | 348/375 |
| 5,606,420 A | | 2/1997 | Maeda et al. | |
| 5,764,286 A | * | 6/1998 | Kawamura et al. ...... | 348/231.6 |
| 6,104,430 A | * | 8/2000 | Fukuoka ..................... | 348/552 |
| 6,115,137 A | * | 9/2000 | Ozawa et al. ............... | 386/125 |
| 6,552,743 B1 | * | 4/2003 | Rissman .................. | 348/207.2 |

* cited by examiner

Primary Examiner—Wendy R. Garber
Assistant Examiner—Matthew L Rosendale
(74) Attorney, Agent, or Firm—Greenblum & Bernstein, P.L.C.

(57) ABSTRACT

When a printer is connected to a digital camera and a compression rate select switch is not operated, a non-compression mode is initially set as a compression mode of image information photographed by the digital camera. If the compression rate select switch is then operated, a compression rate becomes settable. The image information is thus compressed by the compression mode or at the compression rate.

12 Claims, 13 Drawing Sheets

CAMERA, PRINTER AND PICTURE COMPRESSION SYSTEM

BACKGROUND OF THE INVENTION

1. Field of the Invention

The present invention relates to a camera having a plurality of modes with respect to picture compression when recording image data.

2. Description of the Related Art

Conventionally, an image photographed with a camera, for example a digital camera, is displayed on a liquid crystal display monitor of the digital camera, on a display of a personal computer which is connected to the digital camera, or is printed out on a recording sheet by a printer which is connected to the digital camera. As is well known, a conventional silver-halide film picture has a high accuracy. Therefore, if the image, which is photographed by the digital camera and is printed on the sheet, is compared with the silver-halide picture, it is simply determined that the image on the sheet is inferior to the silver-halide picture with respect to accuracy. Further, since the sheet has capable of representing more pixels than the monitor or the LCD display, the low accuracy of the image, which is printed on the sheet by reproducing compressed data, is conspicuous. Accordingly, the image printed out on the sheet is required to have a higher accuracy than the image displayed on the monitor or the display.

However, in the digital camera, image data is compressed and stored in a memory so as to efficiently use available memory space. Namely, an image data operation in the digital camera, such as compression, is not appropriate in order to maintain a high accuracy of the printed image.

SUMMARY OF THE INVENTION

Therefore, an object of the present invention is to provide a camera having an image data recording mode that is suitable for a higher accuracy print out.

In accordance with an aspect of the present invention, there is provided a camera that comprises a printer connection detector that detects whether a printer is connected to the camera. A non-compression mode, a lossless compression mode or a low-rate compression mode is initially set as a compression mode for recording of image information photographed by the camera, when the printer connection detector detects that the printer is connected to the camera.

The image information is recorded to a portable recording medium, such as a memory card.

The non-compression mode, the lossless compression mode or the low-rate compression mode is initially set as the compression mode of the image information that is recorded in the portable recording medium.

The non-compression mode, the lossless compression mode or the low-rate compression mode is initially set as the compression mode of the image information that is transferred to the printer.

The camera further comprises an input unit that inputs the property information of the printer, which includes a highest resolution limit, from the printer. When the highest resolution limit inputted by the input unit is higher than a resolution of the image information, the non-compression mode is set as the compression mode of the image information, and when the highest resolution limit is lower than the resolution, the image information is compressed at a rate according to the highest resolution limit.

A compression rate at which the image information is recorded is settable regardless of the compression mode initially set.

In accordance with another aspect of the present invention, there is provided a camera including a plurality of photographing modes, such that an image having differing picture qualities is photographable, comprising: a photographing mode fixing mechanism that fixes a manually selected one of the plurality of photographing modes having a desired picture quality; a printer connection detector that detects a connected state of a printer to the camera; and a control mechanism that automatically sets one of the plurality of photographing modes having a highest picture quality at which an image is photographable, when the printer connection detector detects that the printer is connected to the camera.

In accordance with another aspect of the present invention, there is provided a printer that comprises a memory that stores property information, which includes a highest resolution limit of output image information, and an output unit that outputs the property information. The printer is connected to a camera in which a compression mode or a compression rate is set in accordance with the highest resolution limit, when the image information is recorded.

In accordance with another aspect of the present invention, there is provided a picture compression system that comprises a printer, and a camera that includes a printer connection detector. A lossless compression mode or a low-rate compression mode is initially set as a compression mode for recording of image information photographed by said camera, when the printer connection detector detects said printer is connected to the camera.

The printer further comprises: a memory that stores property information, which includes a highest resolution limit of output image information; and an output unit that outputs the property information. The camera further comprises a printer information input unit that inputs the property information outputted from the printer. A compression mode or a compression rate is set in accordance with the highest resolution limit inputted by the printer information input unit, when the image information is recorded.

When the highest resolution limit inputted by the printer information input unit is higher than a resolution of the image information, the non-compression mode is set as the compression mode of the image information, and when the highest resolution limit is lower than the resolution, the image information is compressed at a rate according to the highest resolution limit.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
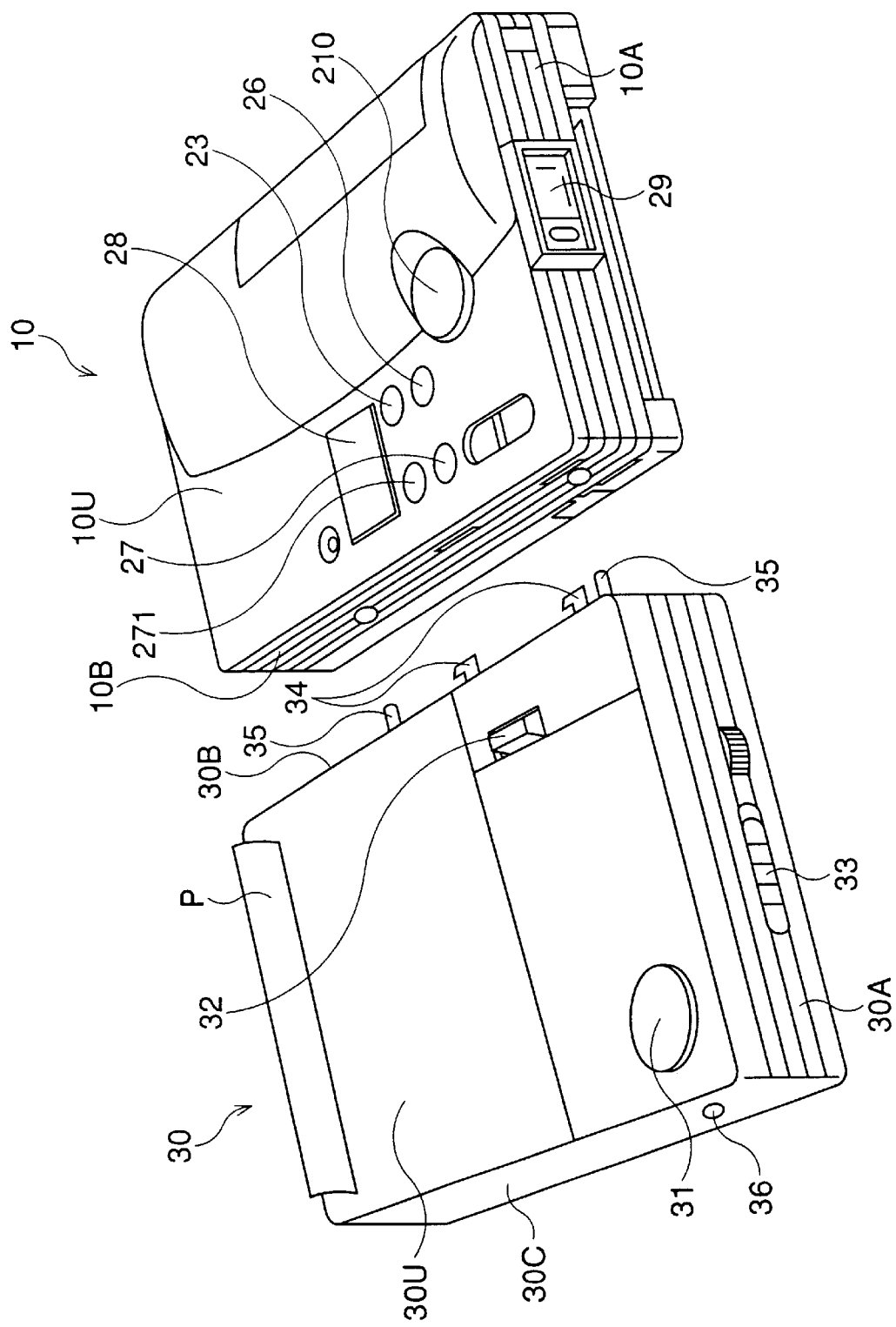
FIG. 1 is a perspective view of a digital camera and a printer, to which an embodiment according to the present invention is applied.

The present invention will now be described with reference to embodiments shown in the drawings.

FIG. 1 is a perspective view of a digital camera and a printer, to which a first embodiment according to the present invention is applied. A digital camera 10 is provided with a release switch 210 on an upper surface 10U. On the upper surface 10U, a print button 23, a recording mode select switch 26, a compression rate select switch 27 and a compression rate fix button 271 are provided close to the release switch 210. When pressing the print button 23, a printing of image data photographed by the digital camera is carried out. Image data is recorded in a memory card (not shown), by operating the recording mode select switch 26. A compression rate of the image data is selected by operating the compression rate select switch 27, and the compression rate is fixed by pressing the compression rate fix button 271. Namely, the compression rate can be manually selected and fixed by a user. When the selected and fixed compression rate is lowered, an image having a higher picture quality can be photographed. The results of operating the recording mode select switch 26 and the compression rate select switch 27 are displayed on a liquid crystal display panel 28, so that the user can confirm the selected recording mode and the value of the selected compression rate. A view finder 29 is provided on a side surface 10A of the digital camera 10 so as to view an object to be photographed.

Note that "compression" in this specification includes a data operation in which predetermined information are sampled from an original image data, causing a decrease in a number of pixel signals of the original image data and a lowering of the resolution of a reproduced image.

A printer 30 is provided with a print button 31, an unlock button 32 on a upper surface 30U. By pressing the print button 31, a printing of the image data photographed by the digital camera 10 is carried out. The printer 30 is removed from the digital camera 10 by pressing the unlock button 32. On the upper surface 30U, a recording sheet P is ejected from an opening (not shown) provided in a side opposite to the side at which the print button 31 is located.

A power switch 33 is provided on a side surface 30A of the printer 30. While the printer 30 is mounted on the digital camera 10, a side surface 30B is in contact with a side surface 10B of the digital camera 10. Locking hooks 34 and positioning pins 35 are provided on the side surface 30B. The locking hooks 34 are resiliently-biased plane hook-shaped boards, which can be moved in the longitudinal direction of the side surface 30B. The positioning pins 35 locate and maintain the positional relationship of the printer 30 and the digital camera 10, when the printer 30 is mounted on the digital camera 10. An AC/DC convertor jack insertion hole 36 is provided on a side surface 30C of the printer 30. An AC/DC adapter (not shown) is connectable to the printer 30 through the insertion hole 36, so that electric power can be supplied from a socket during domestic use.

Figure 2:
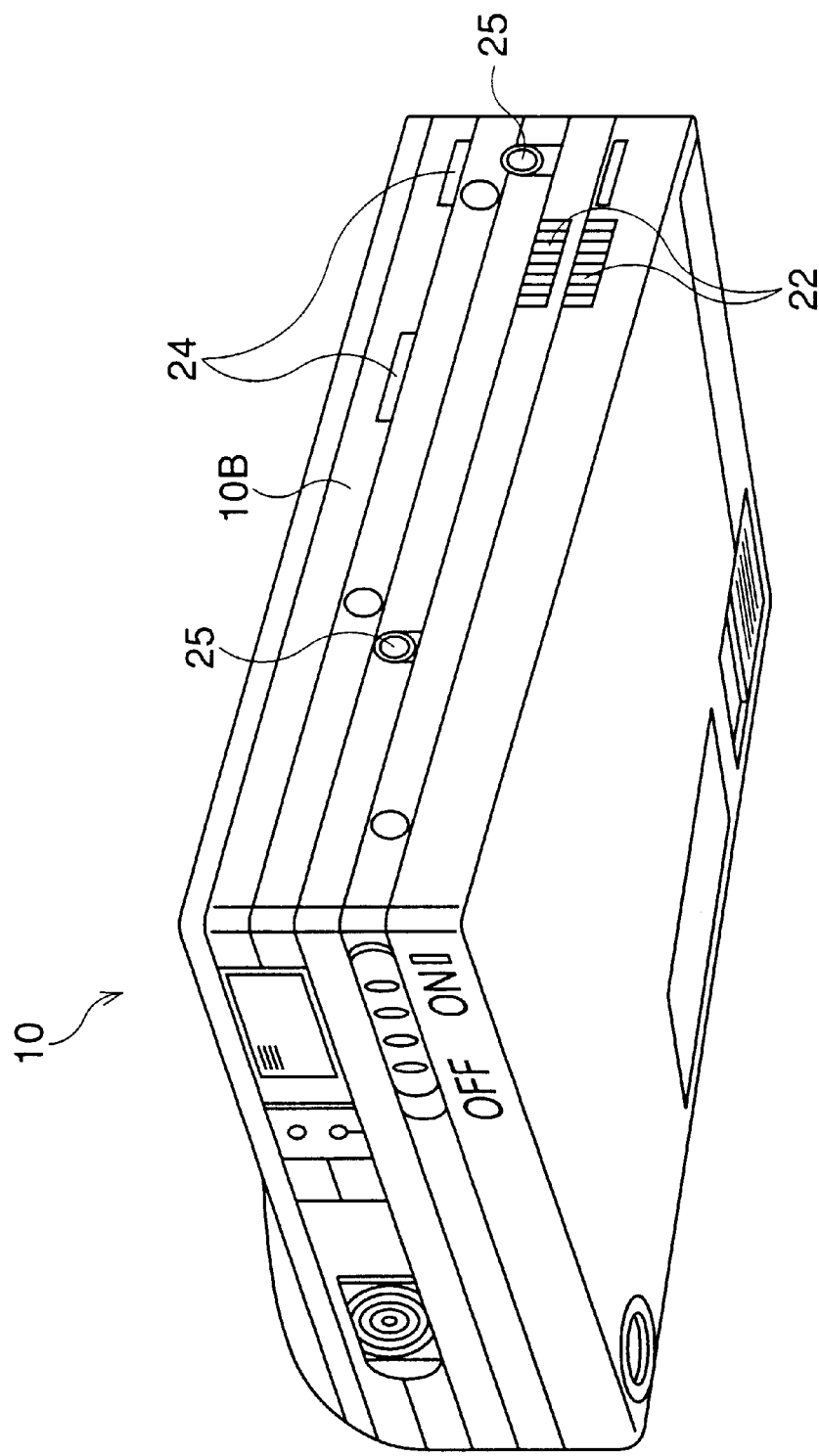
FIG. 2 is a perspective view of the digital camera seen from below.

FIG. 2 is an upward-angled perspective view of the digital camera 10 seen from the side surface 10B. On the side surface 10B, hook receiving holes 24 are located at positions which correspond to each of the locking hooks 34 when the printer 30 is mounted on the digital camera 10, and pin receiving holes 25 are located at positions corresponding to each of the positioning pins 35. The hook receiving holes 24 are slots which engage the locking hooks 34. The pin receiving holes 25 are holes with which the positioning pins 35 are slidably inserted. A printer connector 22 is provided at the bottom of the side surface 10B. The printer connector 22 is connected to a camera connector (not shown) of the printer 30, while the printer 30 is mounted on the digital camera 10. Transferal of data, such as image data, between the digital camera 10 and the printer 30 is performed through the printer connector 22 and the camera connector.

Figure 3:
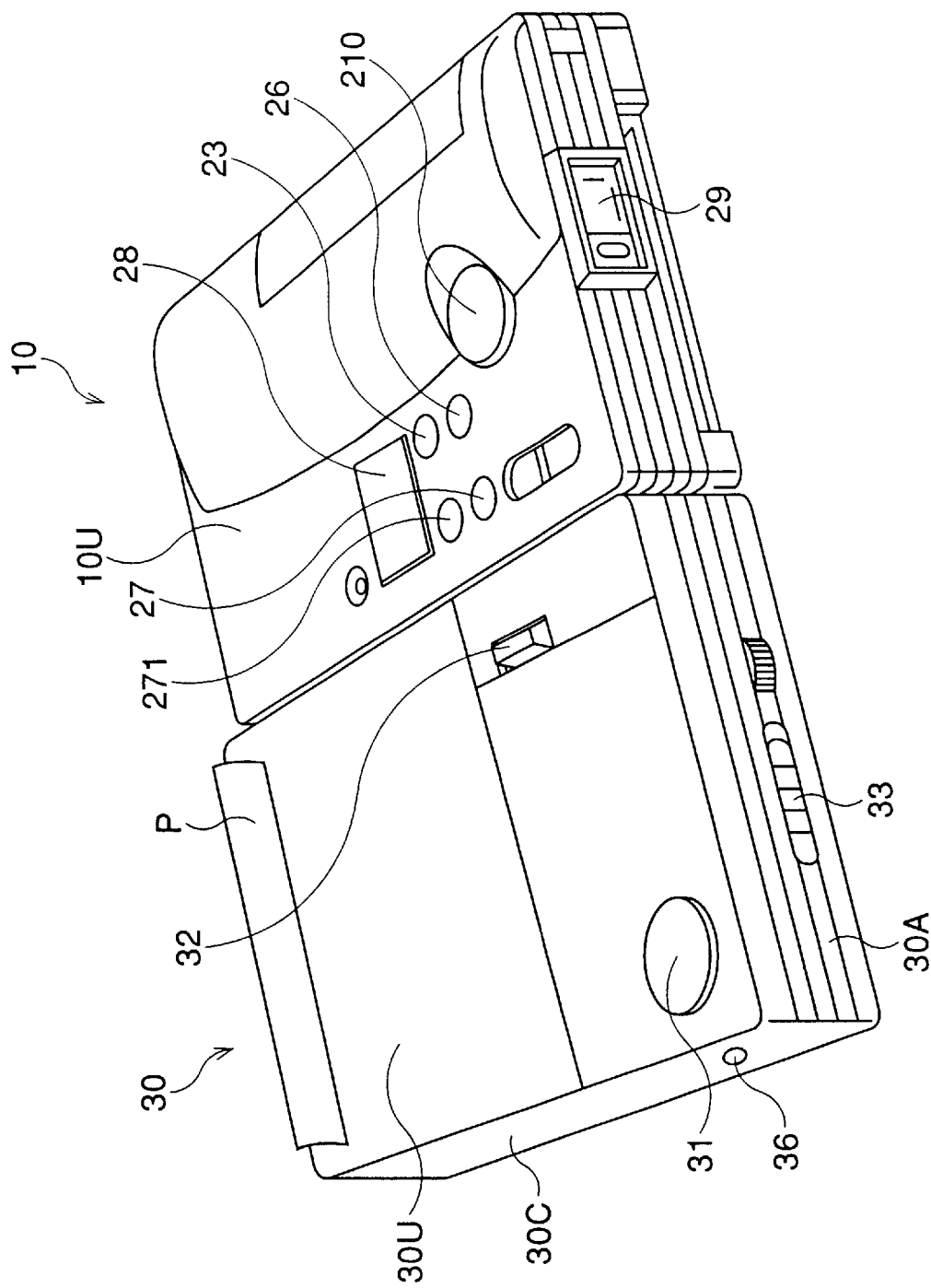
FIG. 3 is a perspective view showing the digital camera with mounted printer.

FIG. 3 is a perspective view showing the digital camera 10 to which the printer 30 is mounted. By locating the positioning pins 35 (see FIG. 1) in the pin receiving holes 25 (see FIG. 2), the locking hooks 34 (see FIG. 1) resiliently engage to the hook receiving holes 24 (see FIG. 2). The printer 30 is thus secured to the digital camera 10 as shown in FIG. 3. If the unlock button 32 is pressed, the locking hooks 34 are forcibly retracted in a direction opposite to the hollow portion of the locking hook 34 in the longitudinal direction of the side surface 30B, and the locking hooks 34 and the hook receiving holes 24 are thus separated, so that the printer 30 can be removed from the digital camera 10.

Figure 4:
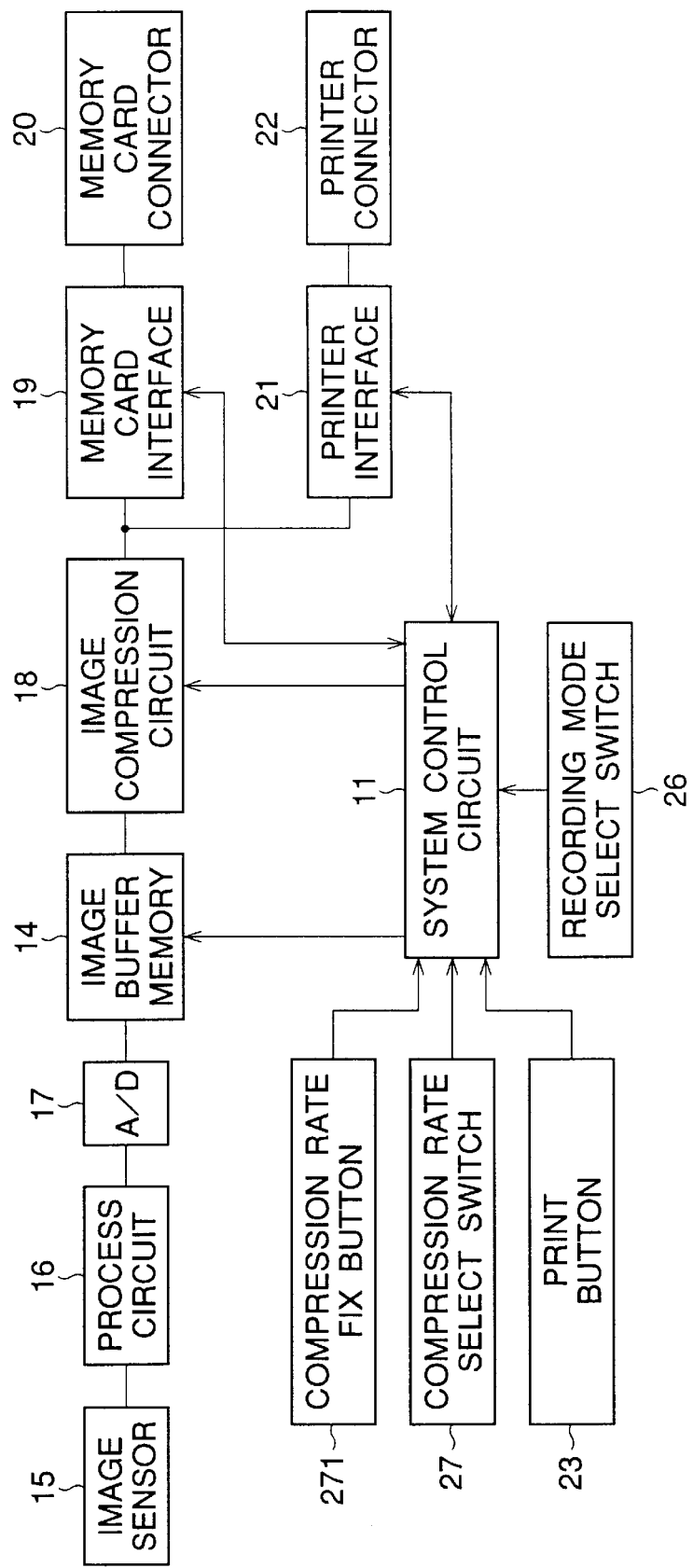
FIG. 4 is a system block diagram of the digital camera.

FIG. 4 is a system block diagram of the digital camera 10. A system control circuit 11 is a micro computer which controls the digital camera 10 as a whole. Under the control of the system control circuit 11, the image data, which has been photoelectrically converted, is read out from an image sensor 15, subjected to predetermined operations, such as a level shifting, sampling and so on, in a process circuit 16, and is converted to a digital image signal in an A/D converting circuit 17. Then, the digital image signal is subjected to predetermined operations, such as a shading correction and a gamma correction, before being temporarily stored as image information in an image buffer memory 14.

The recording mode select switch 26 and the compression rate select switch 27 are connected to the system control circuit 11.

If a mode, by which the image information is recorded in the memory card (not shown), is selected by operating the recording mode select switch 26, the image information is read out from the image buffer memory 14 and compressed by an image compression circuit 18 at a rate which is selected by the compression rate select switch 27 and fixed by the compression rate fix button 271. The compressed image information is recorded in the memory card through a memory card connector 20 after being subjected to predetermined operations, such as, for example, a format transformation in a memory card interface 19.

If the print button 23 is pressed to print out the image data, the image information, stored in the image buffer memory 14, is similarly compressed according to the control of the system control circuit 11. Under the control of the system control circuit 11, the compressed image information is transferred to the printer 30 (not shown in FIG. 4) through the printer connector 22, after being subjected to predetermined operations, such as, for example, a format transformation in a printer interface 21.

Figure 5:
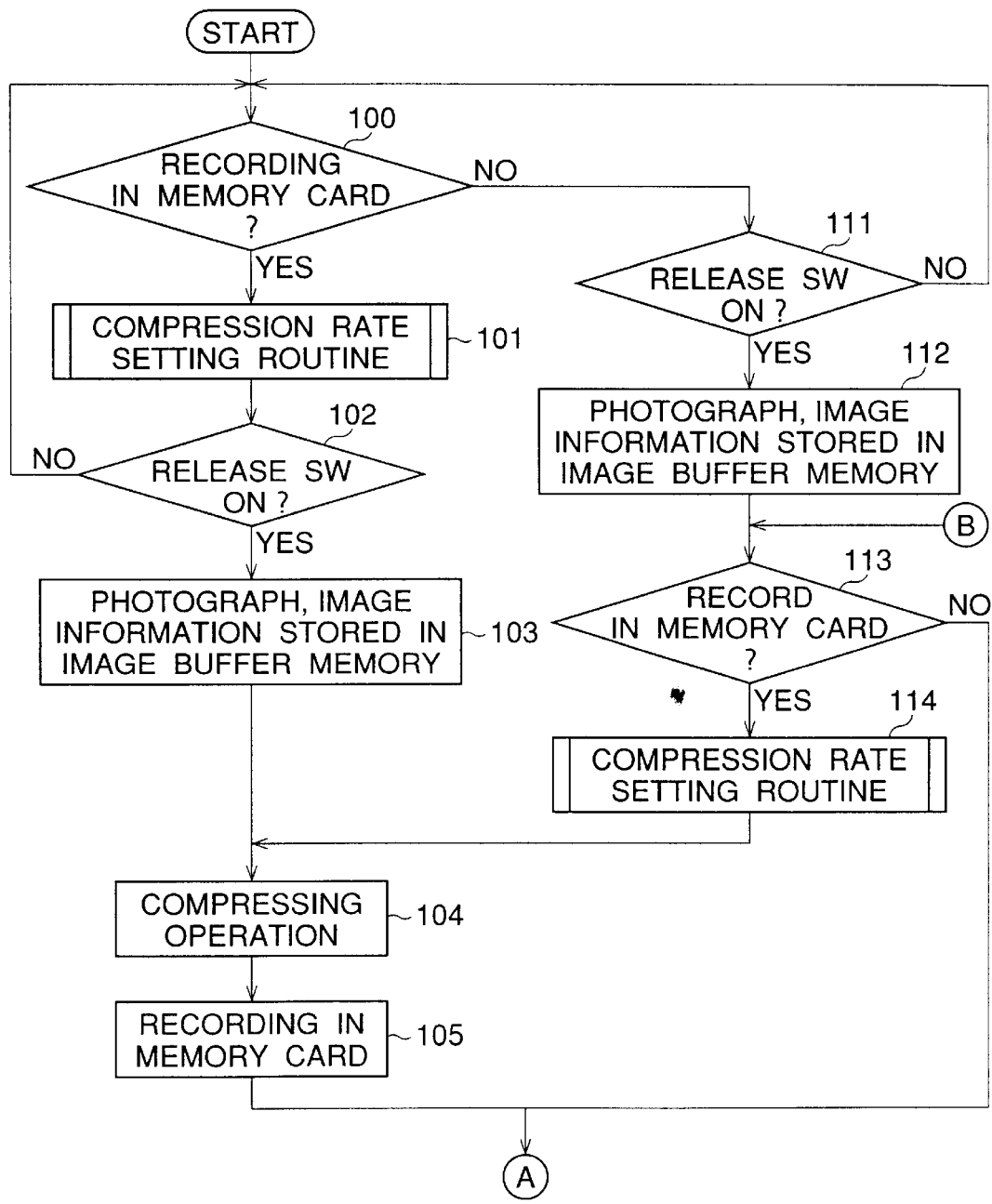
FIG. 5 is a first part of a flowchart indicating the operation of the digital camera of the first embodiment to which the present invention is applied.
Figure 6:
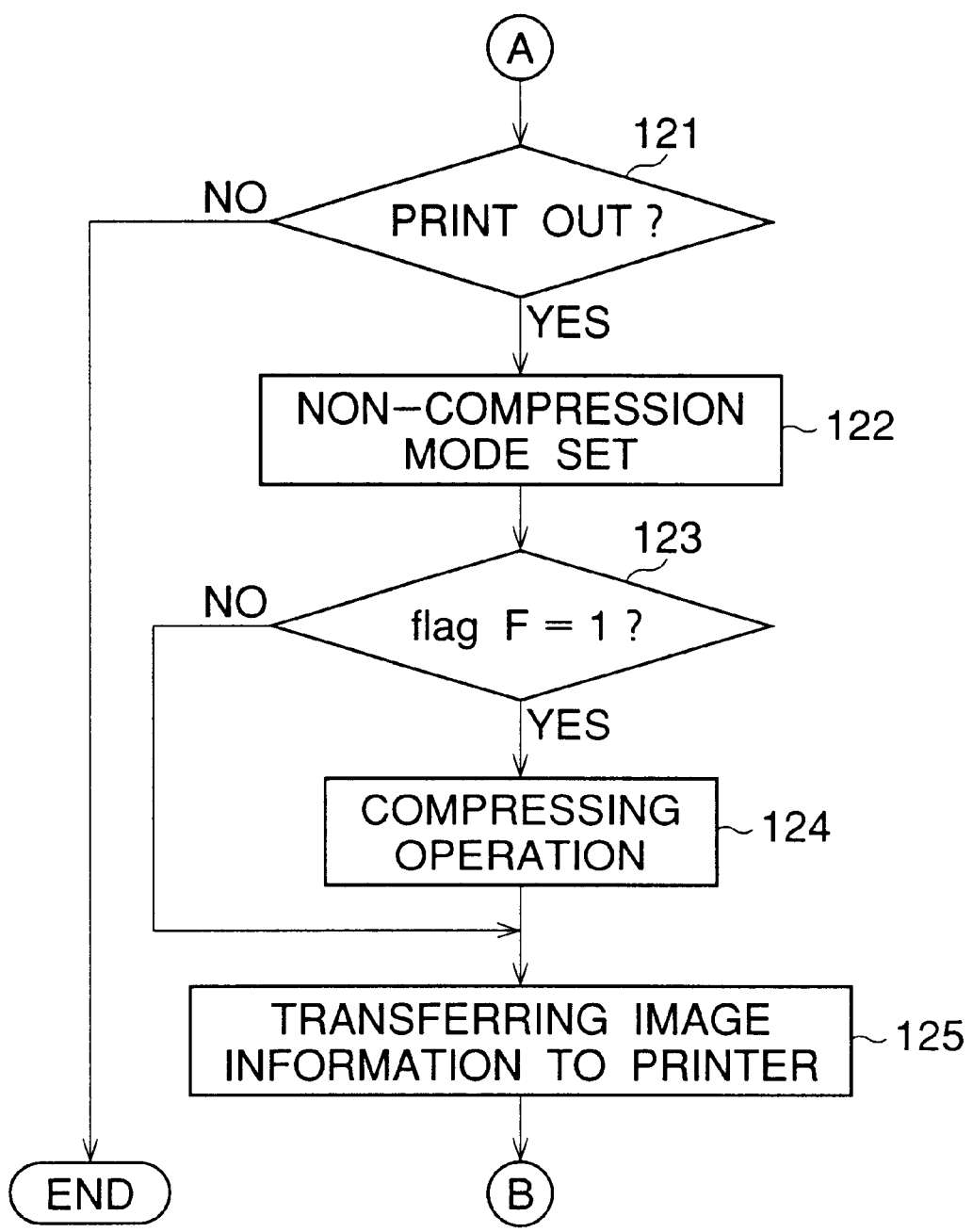
FIG. 6 is a latter part of the flowchart indicating the operation of the digital camera of the first embodiment.

FIG. 5 is a first part of a flowchart indicating the operation of the digital camera 10 of the first embodiment, and FIG. 6 is a latter part of the flowchart indicating the operation of the digital camera 10. Namely, the flowchart as shown in FIGS. 5 and 6 is a main operation flowchart of the digital camera 10.

In step 100, it is determined whether a recording mode, by which the image information is recorded in the memory card, has been selected with the recording mode select switch 26 (see FIG. 1). If the recording mode is selected, in step 101, a compression rate setting routine is performed.

Figure 7:
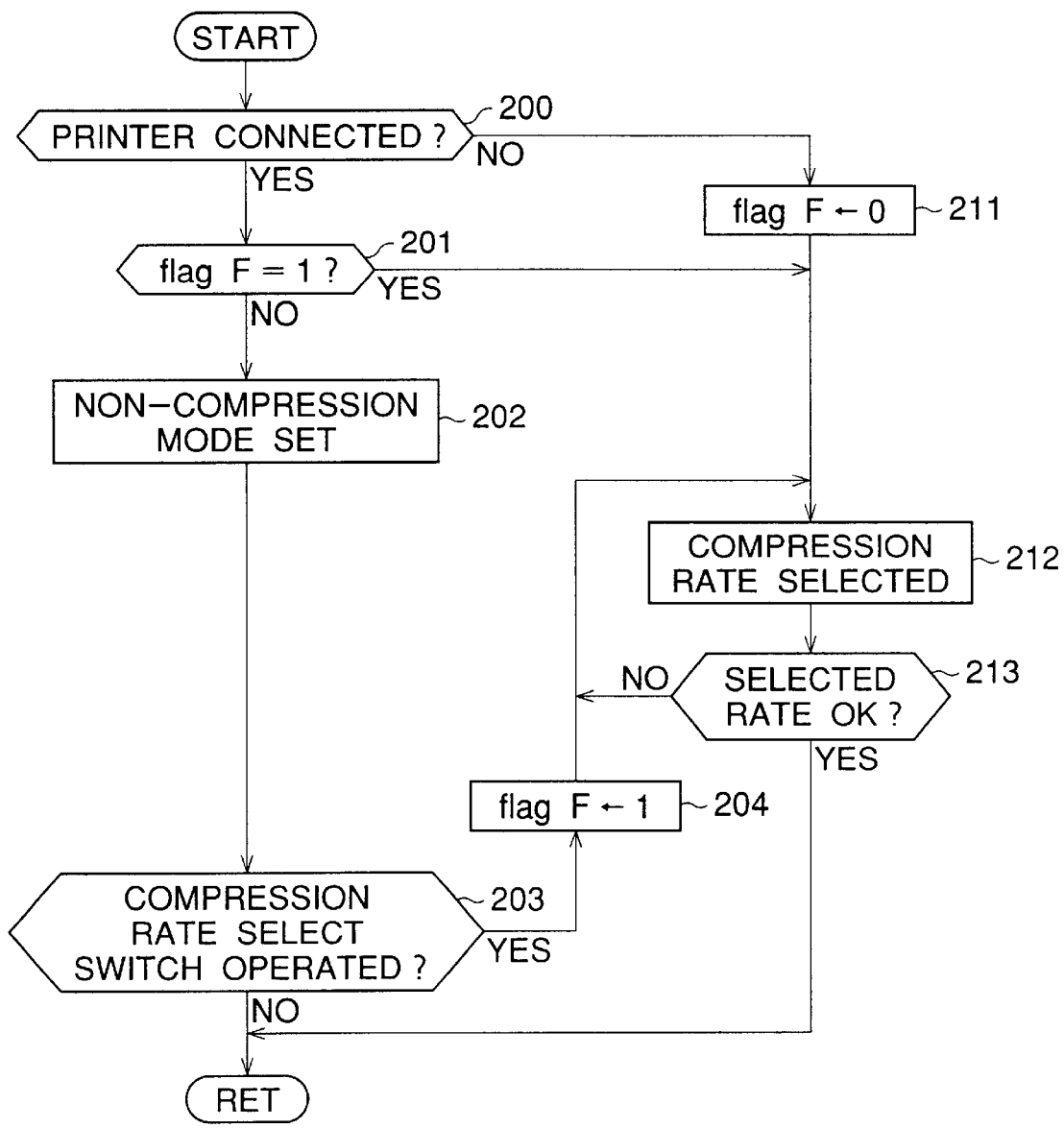
FIG. 7 is a flowchart indicating a compression rate setting routine of the first embodiment.

FIG. 7 is a flowchart indicating the compression rate setting routine. In step 200, it is determined whether the printer 30 is connected to the digital camera 10 (see FIG. 3). If the printer 30 is connected to the digital camera 10, the procedure goes to step 201, and if the printer 30 is not connected to the digital camera 10, the procedure goes to step 211. In step 201, it is determined if the value of a flag F is "1". When the compression rate select switch 27 is operated, the flag F is set to "1". The flag F is reset if the power of the digital camera 30 is reset.

If the value of the flag F is not "1" in step 201, namely, in the case that the printer 30 is connected to the digital camera 10 and the compression rate select switch 27 is not operated, the procedure goes to step 202, in which a non-compression mode is set as an initial mode. In step 203, it is determined whether the compression rate select switch 27 has been operated by an operator during the operation of the digital camera 10. If the compression rate select switch 27 has been operated, the flag F is set to "1" and the procedure goes to step 212. If the compression rate select switch 27 is not operated, the compression rate setting routine ends.

If the value of the flag F is "1" in step 201, namely in the case that the printer 30 is connected to the digital camera 10 and the compression rate select switch 27 has been operated, the procedure goes to step 212.

Further, in step 200, if the printer 30 is not connected to the digital camera 10, the procedure goes to step 211. In step 211, "0" is set to the flag F, and the procedure goes to step 212.

As described above, the procedure goes to step 212 in the cases when: the printer 30 is not connected; the printer 30 is connected and the compression rate select switch 27 is operated; the printer 30 is connected and the compression rate select switch 27 is operated after the non-compression mode is set as the initial mode. In step 212, the compression rate of the image information is set in accordance with the operation by the operator of the compression rate select switch 27.

Namely, if the printer 30 is connected to the digital camera 10, the non-compression mode is initially set in order to avoid the low accuracy of the image information printed out due to an undesired compression of the image information. If the printer 30 is not connected to the digital camera 10, or the compression rate select switch 27 is operated, the selected compression rate is set. Further, by operating the compression rate select switch 27, the compression rate can be set regardless of the compression mode initially set, whereby the image information is compressed when recorded.

In step 213, the compression rate set by the operation of the compression rate select switch 27 is confirmed. When the selected compression rate is confirmed as a desired rate by pressing the compression rate fix button 271, the compression rate setting routine ends. If the operator desires to change the compression rate, namely if the compression rate fix button 271 is not pressed and the selected compression rate is not fixed, the procedure returns to step 212. Namely, until the compression rate fix button 271 is pressed, step 212 and step 213 are repeatedly performed.

After the compression rate setting routine ends, the procedure returns to step 102 of the flowchart of FIG. 5.

In step 102, it is determined whether the release switch 210 (see FIGS. 1 and 3) has been pressed. If the release switch 210 has been pressed, the procedure goes to step 103. If the release switch 210 has not been pressed, the procedure returns to step 100.

In step 103, the image information, which has been photographed by the digital camera 10 and subjected to the above-mentioned operations, is temporarily stored in the image buffer memory 14 (see FIG. 4). In step 104, the image information is read out from the image buffer memory 14, and is compressed by the compression mode or at the compression rate, set in the compression rate setting routine. In step 105, the compressed image information is recorded in the memory card, and the procedure goes to step 121 of the flowchart shown in FIG. 6.

On the other hand, if it is confirmed in step 100 that the recording mode has not been selected, the procedure goes to step 111. In step 111, it is determined whether the release switch 210 has been pressed. If the release switch 210 has been pressed, the procedure goes to step 112. If the release switch 210 has not been pressed, the procedure returns to step 100.

In step 112, similarly to step 103, the image information, which has been photographed by the digital camera 10 and subjected to the above-mentioned operations, is temporarily stored in the image buffer memory 14. In step 113, it is again determined whether the recording mode has been selected by the operation of the recording mode select switch 26. If the recording mode has been selected, the procedure goes to step 114 and the compression rate setting routine, indicated by the flowchart of FIG. 7, is performed. After the compression rate setting routine is performed, the operations from step 104 are performed as described above. If the recording mode has not been selected, the procedure goes to step 121.

In step 121, it is determined whether the print button 23 has been operated by the operator and the output operation of the image information to the printer 30 has been selected. If the output operation has been selected, the procedure goes to step 122. If the output operation has not been selected, the procedure ends. In step 122, the non-compression mode is set. Step 122 is performed to avoid the image information being compressed at the rate which has been selected for recording the image information in the memory card, before the image information is transferred to the printer 30.

In step 123, the value of the flag F is checked. As described above, the flag F is set to "1" when the printer 30 is connected to the digital camera 10 and the compression rate select switch 27 (see FIG. 1) is operated. Accordingly, if the value of the flag F is "1", the procedure goes to step 124, in which the image information is compressed by the mode or at the rate set in the compression rate setting routine, and then proceeds to step 125. On the other hand, if the value of the flag F is not "1", the procedure skips to step 125 due to the non-compression mode being set, i.e. without performing compression of the image information. In step 125, the image information is transferred to the printer 30 through the printer connector 22 (see FIG. 2), and the procedure then returns to step 113 of the flowchart shown in FIG. 5.

As described above, when the image information is printed out, namely when the printer 30 is connected, the non-compression mode is automatically set as an initial mode, and the image information is compressed by an image compression circuit 18 at the selected rate only when the compression rate select switch 27 is operated.

Figure 8:
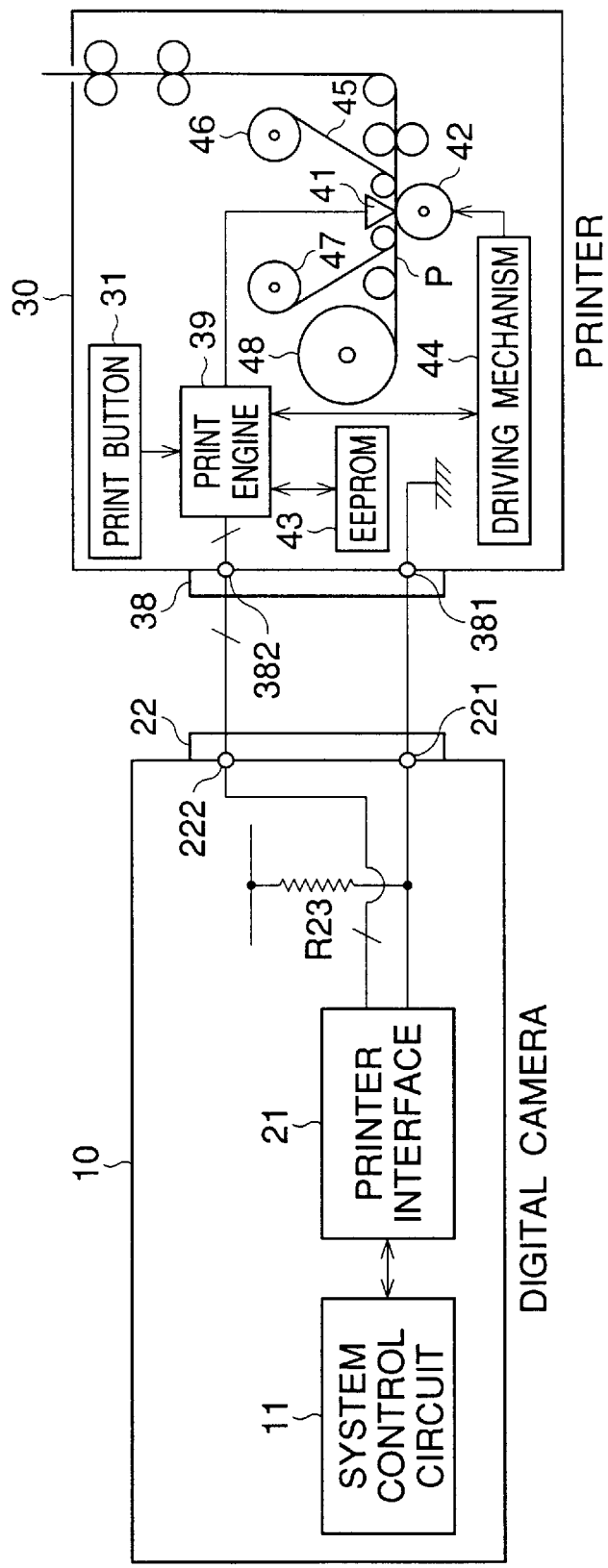
FIG. 8 is a block diagram showing a printer connection sensing system.

FIG. 8 is a block diagram showing a printer connection sensing system of step 200 in FIG. 7 and the outline of the structure of the printer 30. In the digital camera 10, a printer interface 21 and a resistance R23 are connected to a connection sensing terminal 221 of the printer connector 22. A predetermined voltage is supplied to a terminal of the resistance R23, which is not connected to the printer interface 21. The printer interface 21 is connected to the system control circuit When the printer 30 is mounted on the digital camera 10, the camera connector 38 of the printer 30 is connected to the printer connector 22 of the digital camera 10. A connection sensing terminal 381 of the camera connector 38 is grounded. When the printer connector 22 and the camera connector 38 are connected, the connection sensing terminal 221 and 381 are connected, so that the voltage across the resistance R23 becomes low. The system control circuit 11 judges that the printer 30 is connected to the digital camera 10, by detecting that the low voltage across the resistance R23 through the printer interface 21.

As described above, when the printer 30 is connected, the image information stored in the image buffer memory 14 (see FIG. 4) is read out and input to a print engine 39 through an image terminal 222 of the printer connecter 22 and an image terminal 382 of the camera connector 38.

A thermal head 41, an EEPROM 43 and a driving mechanism 44 are connected to the print engine 39. In the EEPROM 43, data for communication with the digital camera 10, data for control of the printer 30, the property information of the printer 30, which includes a highest resolution limit, and the like, are pre stored. A platen roller 42 is connected to the driving mechanism 44. A heat transcription ribbon 45 is set between the thermal head 41 and the platen roller 42. A used end of the ribbon 45 is taken up by a take-up spool 46, and an unused end of the ribbon 45 is wound off a spool 47.

A recording sheet P, which is wound off a recording sheet spool 48, is set between the heat transcription ribbon 45 and the platen roller 42.

A control signal, outputted from the print engine 39 to the thermal head 41, is based on the image information transferred from the digital camera 10, so that the image information is printed on the recording sheet P in accordance with the control signal. During printing, the recording sheet P is wound off from the recording sheet spool 48 by rotation of the platen roller 42 based on the control of the driving mechanism 44, and the heat transcription ribbon 45 is wound off from the spool 47 and taken up by the take-up spool 46. The recording sheet P, on which the image information is printed, is fed by leading rollers with being ejected from the ejection opening.

As described above, according to the first embodiment, in the case that the printer 30 is connected to the digital camera 10, the non-compression mode is initially set, and the image information is recorded in the memory card or transferred to the printer 30 without compression, unless the compression rate select switch 27 is operated. Therefore, when the image information is printed out, undesirable compression of the image information is avoided.

Note that, in the first embodiment, the printer 30 is directly connected to the digital camera 10, however, the printer 30 can be connected to the digital camera 10, for example, through a printer cable.

Figure 9:
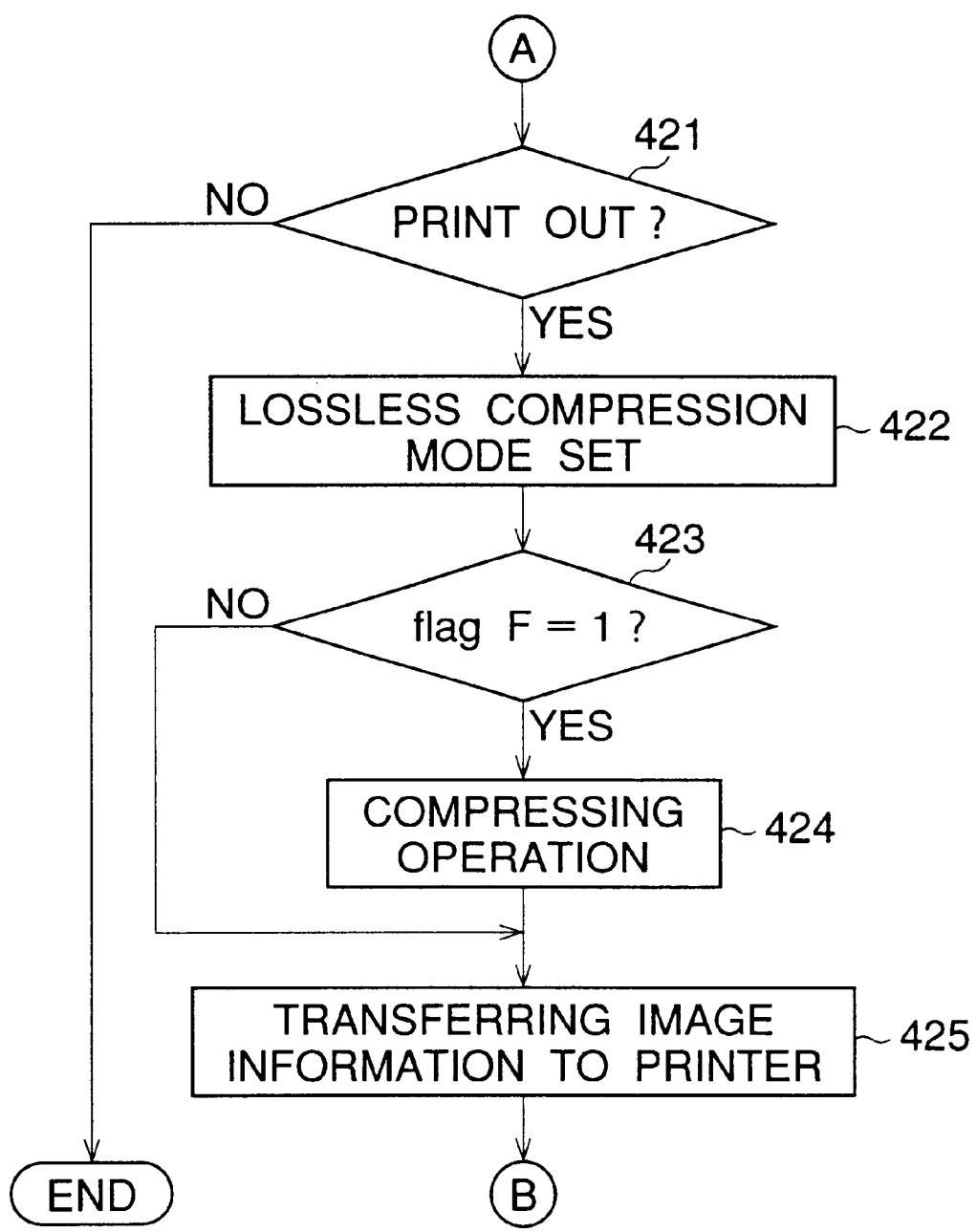
FIG. 9 is a first modification of the latter part of the flowchart indicating the operation of the digital camera of the first embodiment.
Figure 10:
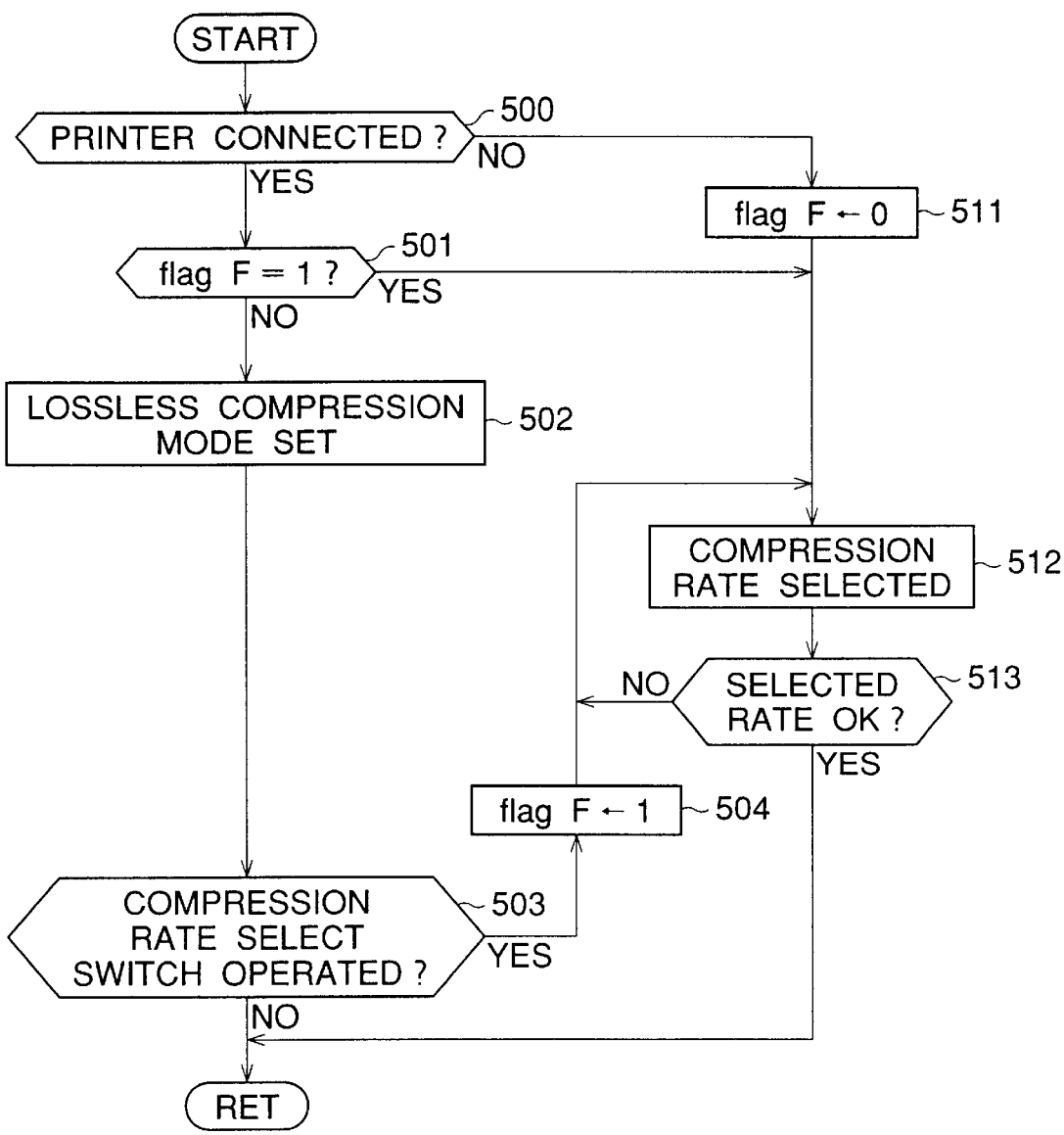
FIG. 10 is a flowchart indicating a compression rate setting routine of the first modification.

As a first modification of the first embodiment, a lossless compression mode can be initially set as shown in FIGS. 9 and 10. Namely, in step 422 of the flowchart of FIG. 9 and in step 502 of the flowchart of the FIG. 10, the lossless compression mode is set as the initial mode with the other steps being identified to those in FIGS. 6 and 8, respectively. The lossless compression mode is a compression mode by which original image data is completely reproduced from compressed image information.

Figure 11:
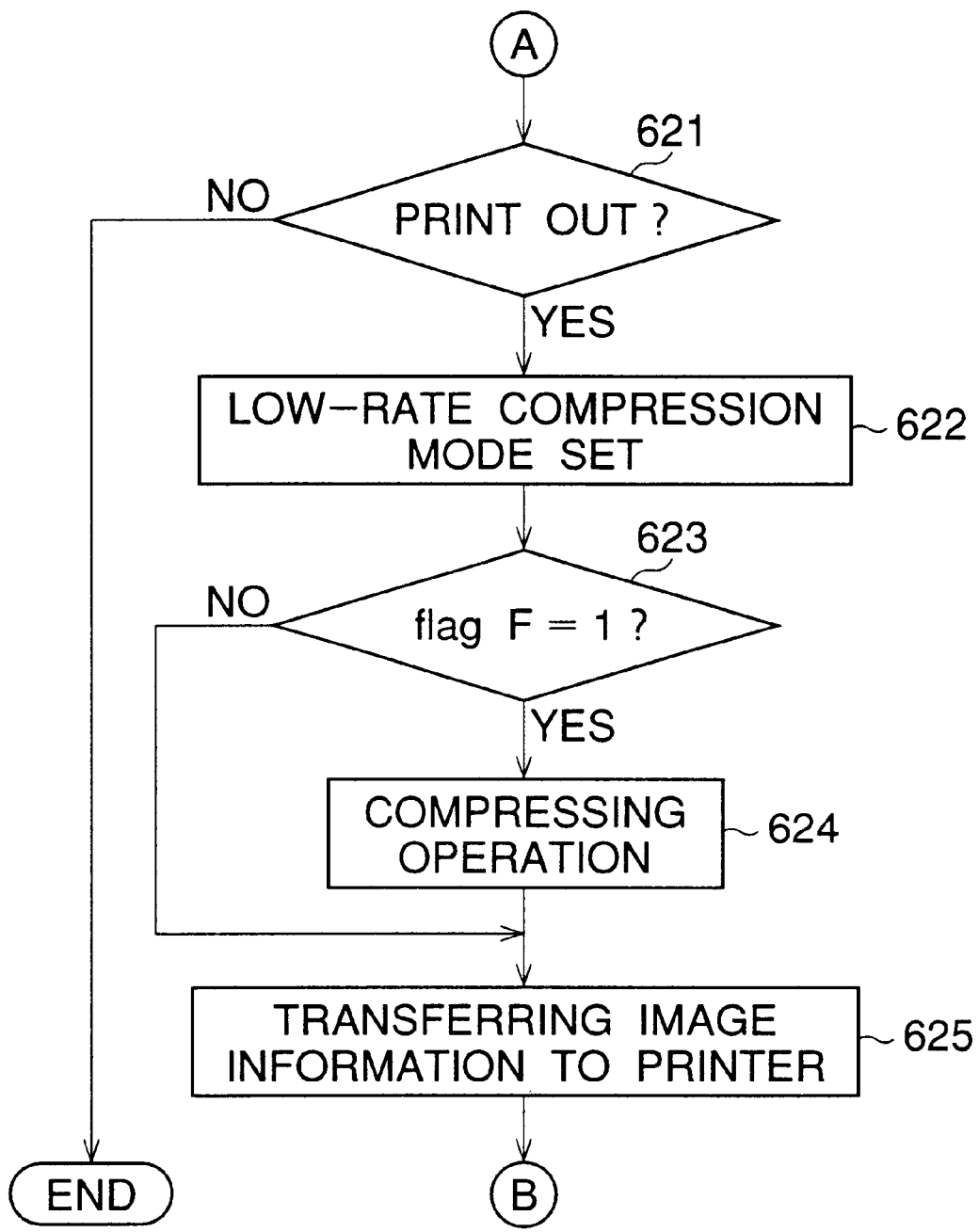
FIG. 11 is a second modification of the latter part of the flowchart indicating the operation of the digital camera of the first embodiment.
Figure 12:
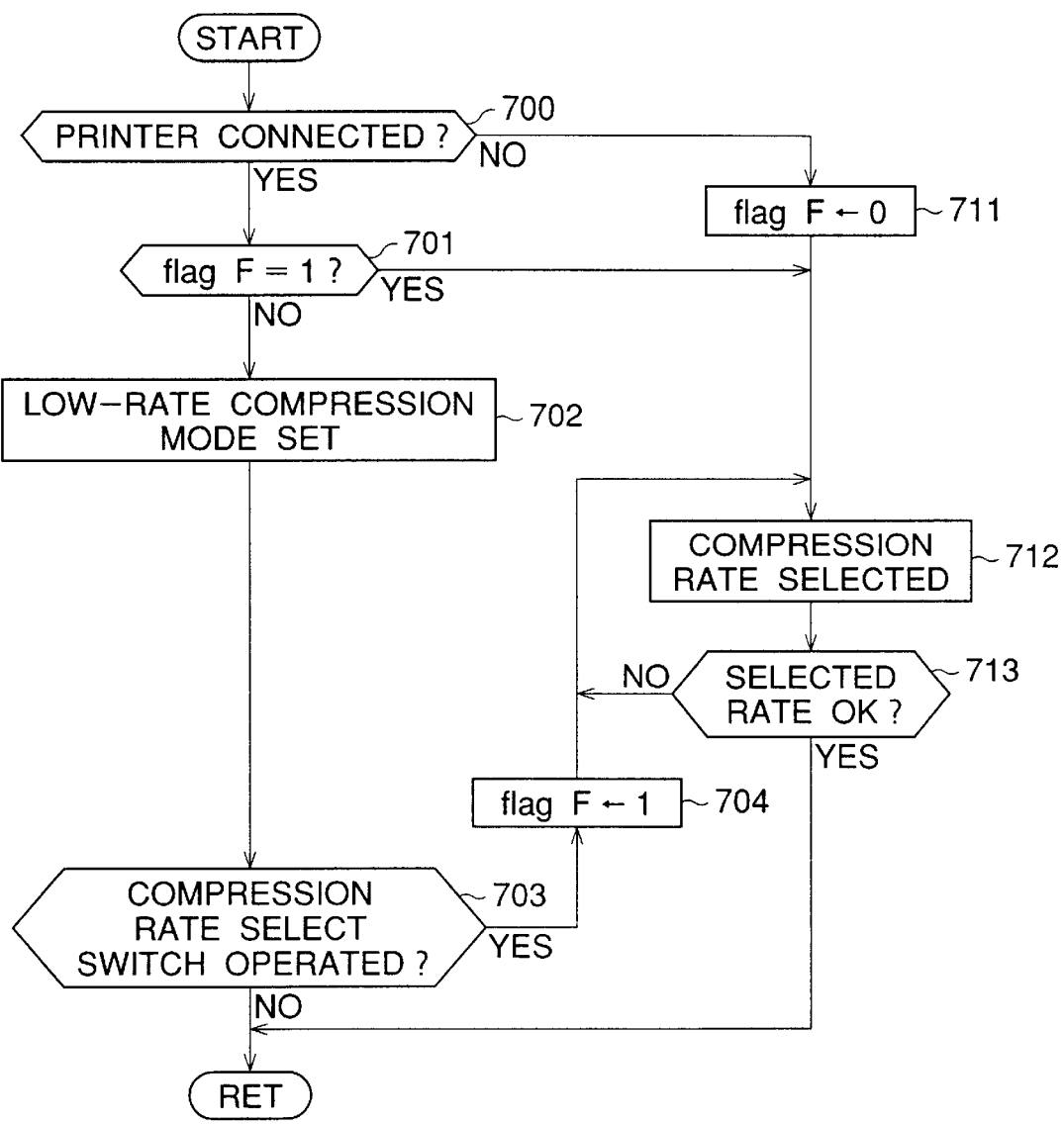
FIG. 12 is a flowchart indicating a compression rate setting routine of the second modification.

Further, as a second modification of the first embodiment, a low-rate compression mode can be initially set as shown in FIGS. 11 and 12. Namely, in step 622 of the flowchart of FIG. 11 and in step 702 of the flowchart of the FIG. 12, the low-rate compression mode is set as the initial mode with the other steps being identical to those in FIGS. 6 and 7, respectively. In the low-rate compression mode, the image information is compressed at a lower rate than a conventional picture compression.

In the above mentioned modifications, in the case that the printer 30 is connected to the digital camera 10, the lossless compression mode or the low-rate compression mode is initially set, and the image information, which is compressed by the lossless compression or at the low-rate compression, is recorded in the memory card or transferred to the printer 30, unless the compression rate select switch 27 is operated.

Figure 13:
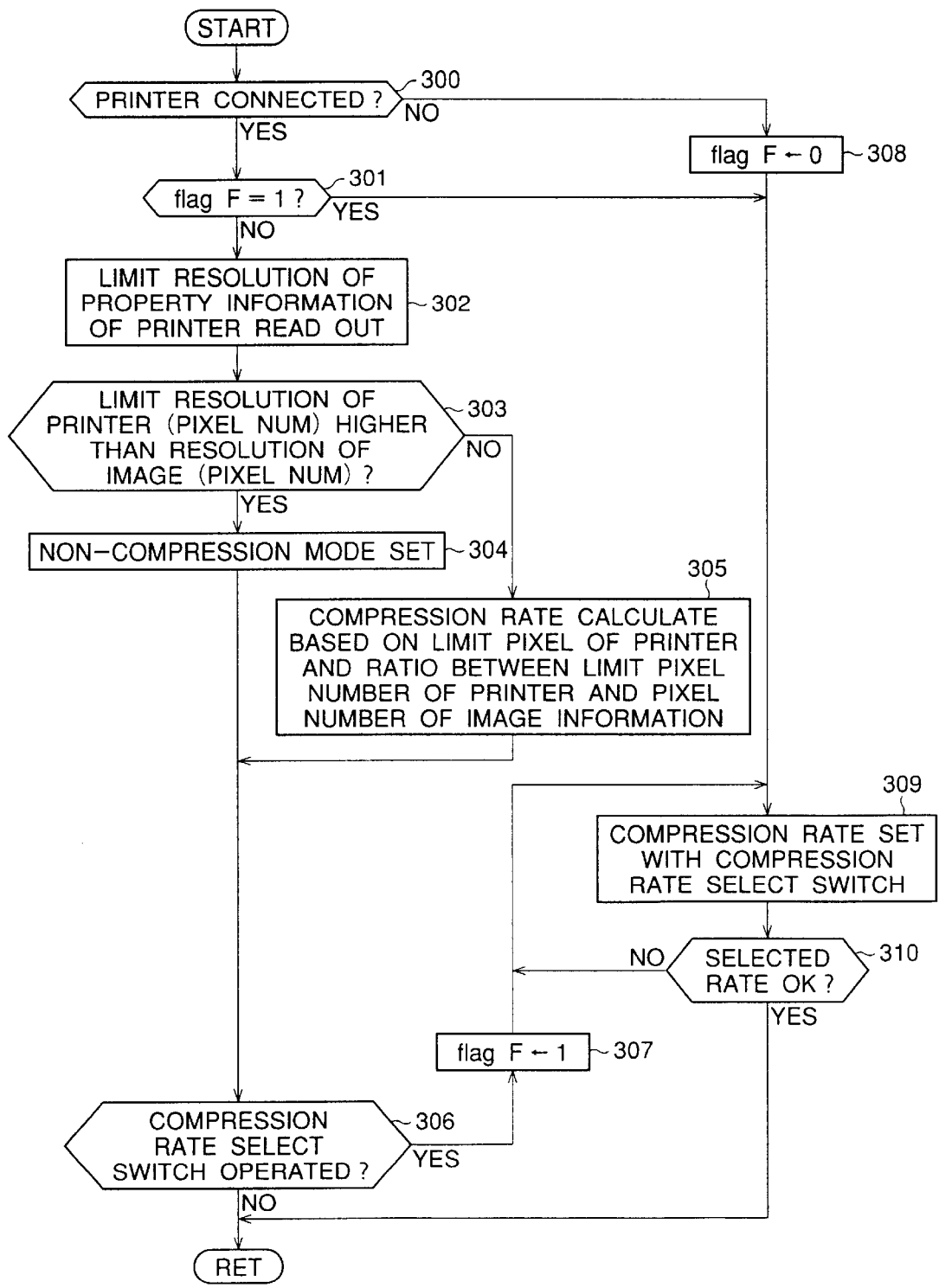
FIG. 13 is a flowchart indicating a compression rate setting routine of a second embodiment according to the present invention.

FIG. 13 is a flowchart indicating a compression rate setting routine of a second embodiment according to the present invention. Note that the constructions of a digital camera and a printer to which the second embodiment is applied, are mostly similar to those of the first embodiment, except for the printer engine 39 of the printer. In the second embodiment, the highest resolution limit stored in the EEPROM 43 is outputted through the image terminal 382 by the printer engine 39. Thus, the highest resolution limit is inputted to the digital camera 10 through the image terminal 382 and the image terminal 222.

Similarly to the first embodiment, the compression rate setting routine of the second embodiment is called in step 101 or in step 114 of the flowchart of the operation of the digital camera shown in FIG. 5.

In step 300, it is determined whether the printer 30 is connected to the digital camera 10. If the printer 30 is connected, the process goes to step 301, and if the printer 30 is not connected, the process goes to step 308. In step 301, it is determined whether the flag F is set to "1". The flag F is similar in function to that of the first embodiment.

If the flag F is not set to "1", the process goes to step 302. In step 302, the highest resolution limit of the property information stored in the EEPROM 43 (see FIG. 8) of the printer 30, i.e. a number of pixels of the printer 30, is read out through the image terminals 382 and 222. Then, in step 303, the highest resolution limit is compared with a resolution of the image information stored in the image buffer memory 14 (see FIG. 4). If the highest resolution limit of the printer 30 is higher than the resolution of the image information, an image, the resolution of which is not lowered, can be printed out by transferring the image information without compression to the printer 30. Accordingly, the process goes to step 304, and in step 304, the non-compression mode is set. Then, the process goes to step 306.

On the other hand, if the highest resolution limit of the printer 30 is lower than the resolution of the image information, some random pixels of the image information would be lost when the image information is printed out without compression using the printer 30, whereby the resolution of the image printed out would be lowered. Accordingly, the process goes to step 305, and in step 305, the ratio between the highest resolution limit of the printer 30 and the resolution of the image information is calculated. In other words, the ratio between the number of pixels limit of the printer 30 and the number of pixels of the image information is calculated. Then, the compression rate is calculated and set based on the ratio and the highest resolution limit of the printer 30. After that, the process goes to step 306.

In step 306, it is determined whether the compression rate select switch 27 has been operated while operating the digital camera 10. If the compression rate select switch 27 has been operated, the flag F is set to "1", and the process goes to step 309. If the compression rate select switch 27 has not been operated, the compression rate setting routine ends.

If the value of the flag F is "1" in step 301, the process goes to step 309. Further, if the printer 30 is not connected in step 300, the process goes to step 308 and the flag F is set to "0". After that, the process goes to step 309. The operations of steps 309 and 310 are similar to those of steps 212 and 213 of the flowchart of the first embodiment shown in FIG. 7 and as such are not described again.

After the compression rate setting routine ends, the procedure returns to step 101 or step 114 of the flowchart shown in FIG. 5, similarly to the first embodiment.

As described above, according to the second embodiment, when the resolution of the photographed image is higher than the highest resolution limit of the printer 30, the image information is compressed at a rate according to the highest resolution limit. Therefore, undesirable random lost of pixels of the image information transferred to the printer 30 is avoided, and the transfer time of the image information is shortened due to an appropriate compression of the image information.

Thus, according to the present invention, a careless compression of the image information is prevented when the photographed image is printed out.

The present disclosure relates to subject matter contained in Japanese Patent Application No.09-365071 (filed on Dec. 19, 1997) which is expressly incorporated herein, by reference, in its entirety.

What is claimed is:

1. A camera comprising:
a printer connection detector that detects whether a printer is connected to said camera, and
a control mechanism that automatically sets one of a plurality of photographing modes having a highest picture quality at which an image can be photographed, when the printer connection detector detects that the printer is connected to the camera.

2. A camera according to claim 1, wherein said image information is recorded to a portable recording medium.

3. A camera according to claim 2, the plurality of photographing modes including one of a non-compression mode, a lossless compression mode and a low-rate compression mode.

4. A camera according to claim 1, the plurality of photographing modes including one of a non-compression mode, a lossless compression mode and a low-rate compression mode.

5. A camera according to claim 2, wherein said portable recording medium comprises a memory card.

6. A camera according to claim 1, further comprising an input unit that inputs property information of said printer, including a highest resolution limit, from said printer,
wherein, when said highest resolution limit inputted by said input unit is higher than a resolution of said image information, a non-compression mode is set as a compression mode of said image information, and when said highest resolution limit is lower than said resolution, said image information is compressed at a rate according to said highest resolution limit.

7. A camera according to claim 1, wherein a compression rate at which said image information is recorded is settable regardless of said compression mode initially set.

8. A camera including a plurality of photographing modes, such that an image having differing picture qualities is photographable, comprising:
a photographing mode fixing mechanism that fixes a manually selected one of said plurality of photographing modes having a desired picture quality;
a printer connection detector that detects a connected state of a printer to said camera; and
a control mechanism that automatically sets one of said plurality of photographing modes having a highest picture quality at which an image is photographable, when said printer connection detector detects that said printer is connected to said camera.

9. A printer comprising a memory that stores property information, including a highest resolution limit of output image information, and an output unit that outputs said property information,
wherein said printer is connected to a camera in which one of a compression mode and a compression rate is set in accordance with said highest resolution limit, when said image information is recorded.

10. A picture compression system comprising:
a printer, and
a camera that includes a printer connection detector, and a control mechanism that automatically sets one of a plurality of photographing modes having a highest picture quality at which an image can be photographed, when the printer connection detector detects that the printer is connected to the camera.

11. A picture compression system according to claim 10, wherein said printer further comprises: a memory that stores property information, including a highest resolution limit of output image information; and an output unit that outputs said property information,
and said camera further comprises a printer information input unit that inputs said property information outputted from said printer,
one of a compression mode and a compression rate being set in accordance with said highest resolution limit inputted by said printer information input unit, when said image information is recorded.

12. A picture compression system according to claim 11, wherein, when said highest resolution limit input by said printer information input unit is higher than a resolution of said image information, a non-compression mode is set as a compression mode of said image information, and when said highest resolution limit is lower than said resolution, said image information is compressed at a rate according to said highest resolution limit.

* * * * *